3,242,230
COMPOSITIONS COMPRISING POLYURETHANE AND PHENOLIC OR AMINOPLAST RESIN
Emile Edward Habib, Spartanburg, S.C., assignor to Deering Milliken Research Corporation, Spartanburg, S.C., a corporation of Delaware
No Drawing. Filed Apr. 3, 1961, Ser. No. 99,996
39 Claims. (Cl. 260—841)

This invention relates to novel compositions of matter, and to processes for their preparation. More specifically, the invention relates to reaction products of water-soluble polyurethanes with phenolic or amino resins, the reaction products having flexibility characteristics greatly exceeding those of the unmodified thermosetting resin.

Phenolic and amino resins have been used extensively in the production of molded or cast thermosetting articles, because of their comparatively low cost and resistance to moisture and temperature changes. The brittleness of the finished products, however, particularly with the phenolic resins, has precluded even wider use of these resins for commercial applications.

Many attempts have been made to increase the flexibility characteristics of these resins in the molded or cast form, but no completely satisfactory system has been developed. For example, phenolic and amino resins have been admixed with glycerine or glycols, but these components are neither highly effective nor permanent in the molded or cast article. Water, for example, will extract both of these components from the finished product. Moreover, the resin so treated has reduced strength when the additive is used in amounts required to provide even minimal flexibility. More recently, these thermosetting resins have been admixed with copolymers of acrylonitrile and butadiene or isoprene in an attempt to improve the resin characteristics. These polymers, however, are not compatible with the resin and can only be dispersed in the resin. Once again, these copolymers are not particularly effective and the cost of dispersing them within the resins obviously increases the cost of the finished product.

An object of this invention is to provide a co-reactant which is water soluble, which can be added to the thermosetting resin at any time during its preparation and which will thereafter react with the resin to form a novel reaction product which is more flexible and shock resistant than the resin per se. It is a further object of this invention to react a water-soluble polyurethane with the resin so that the polyurethane loses its water solubility whereby it can not be extracted with water or other solvents from the finished product. It is a further object of this invention to provide a water-soluble polyurethane which is fully compatible with the resin in all proportions and which, when reacted with the resin, will provide a novel reaction product which has greatly improved flexibility, shock resistance and strength over the resin per se.

These objects are accomplished in accordance with this invention by reacting with the phenolic or amino resin a water-soluble polyurethane. The resin and polyurethane will react under a wide range of conditions, from room temperature to elevated temperatures, e.g., up to 150° C. or higher. The time of reaction varies inversely with the temperature, e.g., at room temperature several hours, or even days, may be necessary to obtain the degree of reaction provided within just a few hours at slightly elevated temperatures of about 90° C. Optimum conditions for a given reaction will depend on the state of the resin-polyurethane system at the time. For example, thin films, e.g., of about 0.005 inch, may be cured rapidly, i.e., within about 30 minutes, at elevated temperatures of about 90° to 100° C. On the other hand, thick films, e.g., of about 0.030 inch, would tend to blister under these conditions and lower temperatures, with correspondingly longer times, are preferably utilized.

Thermosetting resins increase in molecular weight, or polymer size, through a condensation polymerization mechanism. The conditions for effecting this condensation are well known throughout the art. The water-soluble polyurethane will co-react with the thermosetting resin under any condition whereby the resin would undergo condensation polymerization. For example, at any desired stage after which the early stage (A stage) condensation reaction of the resin has begun, the water-soluble polyurethane can be added in the desired amount and will react with the resin as the condensation reaction proceeds. Preferably, the polyurethane is added to the resin at a stage in its condensation reaction during which the resin is dilutable with water without precipitating the resin from solution. An alcohol, such as ethanol, may be added to the water solution of the polyurethane to increase its compatibility with the resin solution. The resin may be added to the polyurethane during its preparation, if desired, but this latter process is conducted under substantially anhydrous conditions and the resin added must be either substantially water free or the polyurethane must have already been advanced to the desired degree of polymerization. The reaction will continue to proceed as the resin is advanced through the conventional stages toward production of commercial articles, provided sufficient unreacted water-soluble polyurethane is present during these procedures, such as molding or casting.

For most applications, it is preferred that the amount of polyurethane present be controlled so that all the polyurethane will be reacted with the resin, since unreacted polyurethane may be leached out of the finished article under severe treatments with water or alcohol. This effect is not particularly apparent until the weight ratio of polyurethane to resin exceeds about three to one.

By controlling the amounts of polyurethane and resin, different properties may be produced in molded or cast articles prepared therefrom. For example, by using the lower amounts of polyurethane of from about 2 to about 20% by weight, enhanced shock resistance may be imparted to such commercial articles as radio and television cabinets, clock cases, business machines, scale housings, vacuum cleaners, floor polisher housings, plumbing accessories, stove and refrigerator hardware, aluminating reflectors, light fixtures, telephone hand sets, tableware, cosmetic and jewelry containers, housings for mixers or electric shavers, electronic equipment, ignition parts for both auto and aircraft, washing machine agitators, and any other articles generally prepared from thermosetting resins where enhanced shock resistance is desired.

By increasing the amount of polyurethane up to about 50% by weight of the resin-polyurethane system, more flexibilized products may be obtained. For example, by the practice of this embodiment of this invention, highly flexible films may be obtained from the heretofore highly brittle phenolic and amino resins. These reaction products are also suitable for the preparation of industrial grade laminates having greatly improved flexibility, as well as shock resistance, by impregnating or coating in the conventional manner such substrates as glass fabric or mat; craft, sulfite or rag paper; canvas (bleached or unbleached); synthetic fiber fabrics, such as the nylons, polyesters, acrylics and the like; natural fabrics such as wool and cotton; nonwoven mats, asbestos paper or fabrics and the like.

When the polyurethane is present in even greater amounts, e.g., up to about 75% by weight of the resin-polyurethane system, even more flexibility is obtained with the added characteristic of water swellability. These reaction products are highly desired as an impregnant for fabrics for use as tenting, awnings, sandbags, tarpaulins and any other article where enhanced sealing of a coated fabric against water is desired. A further advantage of this embodiment of the invention is that less of the coating is required to provide excellent water-sealability. These reaction products are also highly effective as water absorbent additives to assist retention of water in soil or as a water-swellable sealant in masonry cements.

The term "water-soluble polyurethane" as used herein means the water-soluble reaction product of a polyalkylene ether glycol and a diisocyanate. These polyurethanes may be epoxide and/or aldehyde modified, if desired, although excellent results are obtained with the polyurethane per se. Suitable epoxide and aldehyde compositions will be described hereinafter. The starting water-soluble polyurethanes of this invention include the water-soluble polyalkylene ether glycol polyurethanes having polymeric substituents reactive to carbonyl groups. These are ordinarily secondary nitrogens of the urethane groups or hydroxy alkyl groups attached thereto.

The preferred starting water-soluble polyurethanes for the process of this invention are those having polymeric units of the formula:

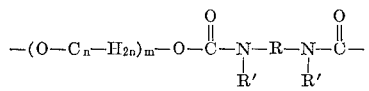

wherein R is a divalent nonreactive aliphatic or aromatic, preferably carbocyclic radical, e.g., lower-alkylene, containing from 2–8 carbon atoms, pyridylene, thiophenylene, phenylene and substituted phenylene, e.g., tolylene, nitrophenylene, para-diphenylene, naphthylene, etc., R' is hydrogen or —CH(R'')—CH(R'')—OH, R'' being hydrogen or a nonreactive aliphatic or aromatic radical, e.g., lower-alkyl containing from 1 to 8 carbon atoms inclusive, phenyl, substituted phenyl, $n$ is an integer from 2 to 8 inclusive, preferably 2, and $m$ is an integer from about 15 to about 450, preferably about 45 to 225 and and more preferably about 100 to 160. The integer $n$ can also be the average value resulting from the alkylene groups alternating between ethylene and, e.g., propylene or a higher alkylene. The water solubility of these polyurethanes may be increased, if desired, by reaction with an epoxide as described in detail hereinafter.

The numerical values of $n$ and $m$ are determined by the starting polyalkylene ether glycol, e.g., $n$ is 2 when the polymer is a polyethylene ether glycol and $m$ is about 133 when the molecular weight of the starting glycol is about 6,000. R is a connecting radical between the isocyanate groups of the diisocyanate employed to produce these polymeric units, e.g., R is phenylene when m-phenylene diisocyanate is employed. R'' is

CH(R''')—CH(R''')—OH when the resulting polyurethane ($R=H$) is further reacted with an epoxide, e.g., —CH(CH$_3$)—CH$_2$OH in the case of the propylene oxide.

These polymeric units are present in polyurethanes of the formula:

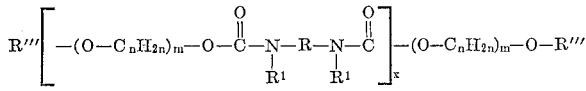

wherein R, R', $n$ and $m$ have the values given above and R''' is hydrogen or

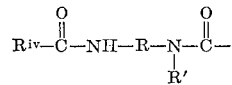

wherein R' has the value given above and R$^{iv}$ is the radical of the compound used to chain terminate the polymerization reaction, e.g., lower-alkoxy, aryloxy, aralkoxy, and $x$ is an integer greater than one, usually a value sufficient to provide a molecular weight of a hundred thousand or more for the resulting polymer. It will be apparent that $x$ increases in value as the polymerization reaction proceeds. No exact value can be ascribed to $x$ as the number varies considerably, depending upon the polymerization reaction conditions and is, at best, an average number. The desired degree of polymerization is best determined by the physical characteristics, e.g., viscosity, film properties, of the resulting product.

The frequency at which R''' is H depends in part upon the molar ratio of diisocyanate to polyethylene ether glycol employed to produce this starting polyurethane. If the lowest possible ratio of 0.5 to 1 were employed, theoretically R''' should always be H and $x$ should be 1. However, to produce a starting polymer having the optimum properties, the molar ratio is preferably from about 1.0:1 to 1.5:1. Under these conditions, R''' should always be the alternate structure given above. However, because of the viscosity of the reaction mixture, neither of these theoretical conditions are probably reached and R''' is probably a mixture of the two alternative possibilities in the resulting polymer molecules.

POLYALKYLENE ETHER GLYCOL DIISOCYANATE STARTING POLYMERS

The starting water-soluble polyalkylene ether glycol diisocyanate polymers of this invention are prepared by reacting a substantially anhydrous polymer of a polyalkylene ether glycol, e.g., having a molecular weight of from about 750 to 20,000 with at least 0.5, e.g., 0.6, 0.7, 0.8 and preferably at least about 1, e.g., 0.9 to 1.2 molar equivalent of a diisocyanate, preferably an aryl diisocyanate. In practice, slightly more than 1 molar equivalent of diisocyanate is ordinarily preferred. Less than 2.0 and ordinarily less than 1.5 molar equivalents is used. The preferred molar ratio of diisocyanate to glycol is from about 1.0:1 to 1.2:1. If other isocyanate reactive groups are present in the reaction mixture, e.g., hydroxy groups, additional diisocyanate must be added if the above molar proportions are to be maintained. A 1:1 molar ratio of isocyanate groups to groups reactive to isocyanate groups is the preferred minimum ratio.

The term "polyalkylene ether glycol" as used throughout the specification and claims refers to water-soluble polyether glycols which are derived from alkylene oxides or glycols and preferably may be represented by the formula HO(C$_n$H$_{2n}$O)$_m$H, in which $n$ is an integer from 2 to 8 and $m$ is an integer from about 15 to about 450. Not all the alkylene radicals present need be the same, and polyether glycols containing a mixture of alkylene radicals can be used. These polyalkylene ether glycols are either viscous liquids or waxy solids. The molecular weights of the polyalkylene ether glycols which are most useful in the process of this invention are from about 2,000 to 10,000 and most desirably from about 4,000 to 8,000, e.g., 5,500 to 7,000. The term includes the polyethylene, polypropylene, polytrimethylene, polytetramethylene, and polybutylene ether glycols. The preferred glycols are polyethylene ether glycols. It will be obvious to one skilled in the art that to produce a water-soluble reaction product, the starting polyalkylene ether glycol must be water-soluble. The water-solubility of the higher molecular weight glycols may be increased by ethoxylation to the desired degree.

The term "substantially anhydrous polymer" is used to define a polymer containing less than about 0.5%, preferably less than 0.1%, moisture, i.e., containing only a trace of moisture. It has been found that some commercial polyalkylene ether glycols containing more than 0.5% moisture sometimes react to produce polymers of lower strength, making them less suitable for copolymerization. This can be avoided by increasing the molar ratio of diisocyanate to compensate for the water present. However, it is preferred to employ substantially anhydrous glycols as defined above.

Although the starting polyalkylene ether glycol polymer and reaction mixture should be substantially anhydrous, the latter preferably is not completely anhydrous as the reaction, to proceed in a desirable fashion, sometimes requires the presence of a trace of moisture, e.g., 10–500 parts per million on the polyalkylene ether glycol, to initiate the reaction. Thus, "substantially anhydrous" when used herein means containing less than 0.1% water. If the polymer solution is rendered anhydrous by distilling the aromatic solvent, water preferably is thereafter added in the range of about 100 to 200 parts per million.

A wide variety of diisocyanates can be used to prepare the starting polymers of this invention, but aryl, especially monophenyl diisocyanates are preferred. Suitable compounds include 2,4-tolylene diisocyanate, 2,6-tolylene diisocyanate, m-phenylene diisocyanate, 2,2'-dinitrodiphenylene-4,4'-diisocyanate, cyclohexylphenyl-4,4'-diisocyanate, hexamethylene diisocyanate, diphenylene-4,4'-diisocyanate, diphenylmethane-4,4'-diisocyanate, di-para-xylylmethane-4,4'-diisocyanate, naphthylene-1,4-diisocyanate and the corresponding 1,5 and 2,7-isomers thereof, fluorene-2,7-diisocyanate, chlorophenylene-2,4-diisocyanate and dicyclohexylmethane-4,4'-diisocyanate.

Any catalyst known to be useful in the reaction of polyalkylene ether glycols with diisocyanate may be used in the present invention including the tertiary organic bases of U.S. Patent 2,692,874, e.g., triethylamine, pyridine, their acid salts, tri-n-butylphosphine and the like. However, it has been found that particularly good results are obtained by using organometallic salts, e.g., cobalt naphthenate and similar salts of lead, zinc, tin, copper and manganese. The organic radicals may be either aliphatic or aromatic residues. Ordinarily, only a very small amount of the organometallic catalyst is required, e.g., from about 0.1 to 0.001% of the reactants.

Although the reaction can be conducted in the absence of a solvent, i.e., as a melt, it is ordinarily preferred to conduct the reaction in an inert solvent to avoid working with too viscous mixtures. Generally speaking, it is preferred to operate with reaction mixtures having a viscosity of less than 1,000,000 cps. It is possible to reach this viscosity, when operating without a solvent, before a reaction product is obtained which has optimum properties. Thus, it is ordinarily desirable to employ a reaction solvent. Toluene is preferred. From a mechanical point, it is advantageous to keep the reaction mass at a viscosity below about 800,000 cps. However, if too much of an inert solvent is employed, it tends to interfere with the reaction and slow it down. This effect can, to a certain extent, be overcome by the use of larger amounts of catalyst. It is ordinarily desirable to employ only that amount of solvent which will impart a viscosity to the reaction mixture in the range of about 100,000 to 1,000,000 cps, preferably around 300,000 to 800,000 cps. With toluene at 75 to 85° C., employing polyethylene ether glycol of a molecular weight in the range of 5,500 to 7,000, this can be accomplished at an initial concentration of about 80% solids. As the reaction proceeds, the increasing molecular weight of the reaction product increases the viscosity of the reaction mixture, thus necessitating the gradual addition of more solvent throughout the reaction if about the same viscosity is to be maintained, e.g., until a final concentration of as low as 50% solids is reached. This serves two purposes, i.e., maintaining the desired viscosity and also slowing down the reaction. Thus, as the reaction product approaches water insolubility or gelation because of its increasing molecular weight, the reaction rate tends to slow down due to the presence of the increasing amounts of solvent, thereby providing more leeway in the time at which the chain terminating agent should be added to prevent the production of a water-insoluble reaction product. The amount of solvent employed can be varied considerably, e.g., from about 10% to 60% of the total reaction mixture.

The temperature of the polymerization reaction can be varied over a considerable range so long as the reaction is stopped at the desired point. The reaction proceeds slowly unless the temperature is above about 65° C. However, the temperature should not exceed 150° C., and preferably should not exceed 110° C. The preferred range is from about 70° C. to 90° C. The reaction time is a function of such factors as temperature, mixing speed, ratio of the reactants, water concentration and amount of catalyst and solvent employed.

Oxidation and discoloration of the reaction product can be avoided by conducting the polymerization reaction in an inert atmosphere, e.g., nitrogen, which also aids in the production of a more uniform reaction product.

When the desired viscosity is reached, the resulting polymer can be chain terminated in the manner described hereinafter, or epoxide modified as described below and then chain terminated or added directly to the resin.

This reaction can proceed concomitantly with the primary polymer production, i.e., as soon as some of the above-described polymer has been produced, it can be reacted with the epoxide. Thus, although the epoxide can be added at almost any point during the primary polymer reaction, the only requirement is that at least the terminal portion of the polymer production is conducted in the presence of the epoxide. The preferred procedure involves adding the epoxide to the reaction mixture for a few minutes, e.g., 1 to 15 minutes, before the polymer is chain terminated, if this procedure is followed.

Examples of epoxides, preferably the compounds which can be prepared from α-glycols, are the lower hydrocarbon, i.e., containing from 2 to 12 carbon atoms, epoxides including styrene oxide, α-phenyl propylene oxide, trimethylene oxide and the other lower alkylene oxides, i.e., epoxides containing from 2 to 8, preferably 2 to 4, carbon atoms, inclusive, e.g., ethylene oxide, propylene oxide, butylene oxide, isobutylene oxide. The epoxides preferably are monofunctional, i.e., contain no other groups reactive to the polymer.

The amount of epoxide which can be added to the polyethylene ether glycol diisocyanate polymer can be varied over a wide range, i.e., from about 0.1 mole per mole of diisocyanate to the theoretical 2 moles per mole of diisocyanate or more. Conveniently, and preferably if the epoxide is volatile, an excess of the epoxide can be added and the excess removed by distillation or evaporation after the reaction has proceeded to the desired extent.

The epoxide modified portion of the polymerization reaction is ordinarily conducted in substantially the same manner as the preceding portion of the polymerization reaction. However, when a particularly volatile epoxide is employed, e.g., ethylene oxide, it may sometimes be necessary to lower the reaction temperature or employ pressure equipment to prevent excessive loss of the epoxide.

As stated above, the point at which the reaction should be modified by the addition of an epoxide so as to produce a polymer which is still water-soluble is not particularly critical, so long as the epoxide is added before the polymer reaches maximum permissible viscosity. Visual inspection of the reaction mass, i.e., its viscosity, reaction to stirring, stringiness, etc., provides a good guide, and with any given reactants, empirical viscosity determinations may be used. The optimum total polymerization reaction time, including the epoxide modified portion can be determined by the procedures described hereinafter.

The polyurethane, modified or not as desired, may be chain terminated prior to use in accordance with this invention, although this expedient is not essential to successful co-reaction.

The chain termination of a polymer is a well known reaction in polymer chemistry. In this step, the terminal, reactive groups of the polymer are reacted with a non-chain extending compound which inactivates these groups. In the instant polymer, the reactive terminal groups are isocyanate groups. These groups merely require a non-chain extending compound having an active hydrogen, i.e., those hydrogen atoms which display activity according to the well known Zerewitinoff test. See J. Am.

Chem. Soc., 49, 3181 (1927). For a discussion of diisocyanate chemistry, see National Aniline Division of Allied Chemical and Dye Corporation Technical Bulletin I–17 and the references cited therein. For the purposes of this invention, such compounds are limited to those which do not form unstable intermediate groups of produce further polymerization, as would be apparent to those skilled in the art. Some polyfunctional compounds, i.e., those having a plurality of active hydrogens, are not preferred because of the tendency of some of these compounds to produce excessive cross linking. The preferred chain terminating agents are thus those having only one active hydrogen. Suitable chain terminating agents are alcohols, water, ammonia, primary amines, cyclic secondary amines, acids, inorganic salts having an active hydrogen, mercaptans, amides, alkanol amines, oximes, etc. The preferred class of compounds are the organic monohydroxy compounds, preferably monohydroxy alcohols and especially the saturated aliphatic monoalcohols, aryl monohydroxy compounds and the like, which can be employed irrespective of the incidence of terminal isocyanate groups. Lower alkanols, i.e., containing from one to eight carbon atoms, inclusive, are preferred, especially those containing less than four carbon atoms. Methanol, ethanol, and isopropanol, being both efficient and inexpensive, are excellent chain terminating agents for terminating the polymerization reaction at the desired point. However, because the aldehyde modification step of this invention is most conveniently conducted as an aqueous solution, the polymer can conveniently be chain terminated by adding enough water to produce the desired solids concentration and then distilling any organic solvent present in the mixture.

The minimum amount of chain terminating agent which should be employed will vary according to the ratio of diisocyanate to hydroxy groups present in the reaction mixture and the extent to which the polymerization reaction has proceeded. While a theoretical minimum may be readily calculated, e.g., 0.01–1 molar equivalent, it is preferred to add at least several molar equivalents, calculated on the diisocyanate used, as a safe excess.

A convenient method of chain terminating the polymerization of the polyurethane is to add an aqueous or alcohol solution of the resin to the polyurethane reaction mass at the point in the polymerization at which the desired degree of polymerization has occurred. The water or alcohol will chain terminate the polymerization.

The total polymerization time, including the epoxide modified portion if this starting polymer is employed, can vary considerably depending, in part, on the molecular weight of the starting polyalkylene ether glycol, the reaction temperature, the catalyst and amount of solvent employed. If the reaction time is too short, under the selected conditions, a relatively low molecular weight reaction product is produced. Conversely, if the reaction time is too long, the reaction product may not be water-soluble.

The exact limits of reaction time, under a particular set of reaction conditions, can be determined by removing samples from the reaction mixture from time to time, chain terminating the sample with a lower alkanol, e.g., ethanol, and then making a 25% aqueous solution thereof, while removing whatever reaction solvent may be present. If the 25% aqueous solution has a viscosity at 25° C. of at least 2,000 cps., and preferably at least 8,000 or more, the desired reaction product can be obtained from the reaction mixture upon chain termination thereof. Obviously, if the alcohol stopped sample is water-insoluble, the reaction has proceeded too far and the reaction time was too long.

Another convenient index for determining the course of reaction is the viscosity of the reaction mixture. If the reaction is conducted at 75 to 85° C. with toluene as a reaction solvent, a 65% solution of the reaction mixture should have a viscosity in the range of 50,000 to 1,000,000 cps. As stated before, such a reaction mixture produces a highly satisfactory reaction product if chain terminated at a viscosity of around 200,000–800,000 cps.

In carrying out a preferred method of the above-described process, a polyethylene ether glycol having an average molecular weight of about 6,000 is melted under nitrogen. Toluene is then added and any water present in the glycol is removed by azeotropic distillation at reduced pressure until the mixture is substantially anhydrous. The cobalt naphthenate is then added followed by the tolylene diisocyanate. Water in an amount of about 150 parts per million is then slowly added. As the reaction proceeds and the viscosity increases, more solvent is slowly added to keep the viscosity within the range of about 200,000 to 300,000 cps. When a 65% solution of the reaction mixture reaches at least 200,000 cps., about 2 molar equivalents of propylene oxide, calculated on the tolylene diisocyanate, is added. When the desired ultimate viscosity of about 500,000 cps. is reached, any excess propylene oxide is removed at reduced pressure and a molar excess, calculated on the tolylene diisocyanate, of ethanol is added as a chain terminating agent. Water is then added and the toluene is stripped from the mixture at reduced pressure. The aqueous residue can then be diluted to a standard concentration.

Alternatively, the starting polymer for the aldehyde modification step can be employed as a solution in an organic rather than aqueous solvent, for example, the solvent employed in the polymerization reaction, as the aldehyde reaction of the process of this invention proceeds in organic solution as well as aqueous solutions.

ALDEHYDE MODIFICATION OF THE POLYURETHANE

The water-soluble polyurethanes described above, whether epoxide modified, chain terminated, or neither, may be reacted, preferably as an aqueous solution, with an aldehyde, thereby producing a reaction product having improved properties, including increased film strength and reduced hydrolysis under high temperatures.

A wide variety of aldehydes can be employed, both aromatic and aliphatic. The aldehyde can be monoaldehydic or polyaldehydic. It is preferred is the aldehyde has no groups other than aldehydic which can be reacted with the starting polymer. Examples of aldehydes, e.g., aliphatic preferably containing one to twelve carbon atoms, include formaldehyde, acetaldehyde, propionaldehyde, butyraldehyde, nonaldehyde, formylcyclohexane, and other lower aliphatic and alicyclic monofunctional aldehydes, glyoxal, pyruvaldehyde, ethylglyoxal, amylglyoxal, and other α-carbonyl lower alphatic aldehydes, benzaldehyde, cinnamaldehyde, phenylacetaldehyde, α-naphthaldehyde, pyrocatechualdehyde, veratraldehyde, α-formylthiophene, α-formylfuran, and other substituted and unsubstituted aromatic aldehydes, dialdehyde starch, and other aldehyde carbohydrates and aldehydic cellulosic materials. The preferred aldehydes are the lower, i.e., containing from one to twelve carbon atoms, inclusive, aliphatic and carbocyclic aromatic monoaldehydes. Formaldehyde is the aldehyde of choice. These aldehydes may also be used in the preparation of thermosetting resins as set forth hereinafter.

The reaction of the starting polymer with the selected aldehyde can be conducted at any convenient temperature, e.g., 0° to 100° C., although a temperature between about 20° C. and 85° C. is more desirable and between about room temperature and about 70° C. preferred. If it is desired to have the reaction reach completion very rapidly, a temperature of about 70° C. should be employed. Conversely, if it is feared that the reaction may proceed too rapidly toward an insoluble product, e.g., when operating at a pH from about 3 to 5 with relatively large amounts of aldehyde, then room temperature or lower should ordinarily be employed.

The reaction can be conducted at any pH between about 3 and about 10. Outside this range, the starting and resulting polymer tend to be unstable. Ordinarily, it is preferred to stay within the range of about 3.5 to about 9.

The amount of aldehyde which can be added to the starting polymer without producing or proceeding too rapidly toward a water-insoluble reaction product is closely related to the pH of the reaction mixture. On the alkaline side, much more of the aldehyde can be added with safety than on the acid side. In fact, at an alkaline pH it is sometimes preferred to have excess unreacted aldehyde in the product as it appears to be more stable to heat. For example, the propylene oxide modified polymer produced from polyethylene ether glycol and tolylene 2,4-diisocyanate, as a 25% aqueous solution with a viscosity of about 15,000 cps., can react, at room temperature, with 0.03%, calculated on polymer solids, of formaldehyde at a pH of 4 and 0.1% formaldehyde at a pH of 5 without producing a water-insoluble gel in a reasonable time, e.g., several days, whereas at a pH of 8, the same polymer can react with 1–3% or more formaldehyde and still produce water-soluble reaction products. It will be apparent from the above that, when operating at an alkaline pH, care should be taken that the pH does not drift during the reaction to the acid side. This can be avoided by conducting the reaction in the absence of oxygen to prevent the air oxidation of the aldehyde or buffering the solution, e.g., with $Na_2HPO_4$. Also, when operating on the acid side, if the reaction product is approaching water insolubility, the pH of the reaction mixture can be adjusted upward, e.g., with an organic or inorganic base, e.g., ethyl amine, sodium hydroxide or ammonia, to render the reaction product less reactive toward the residual aldehyde.

Generally, it is preferred to employ less than 0.1% and more preferably less than 0.5%, of formaldehyde, calculated on the polymer solids, when the reaction is conducted at a pH of less than 7, whereas less than 10% and preferably less than 5% is employed at a pH of greater than 7. The large difference between these amounts of aldehyde apparently is due to the type of reaction which occurs. On the acid side, the reaction appears to be predominately one of cross linking, which increases the molecular weight of the polymer rapidly with a small amount of aldehyde whereas on the alkaline side, the addition is probably linear, e.g., as —$CH_2$—O— groups in the case of formaldehyde.

In any case, the reaction is conducted for a time less than that required to produce a water-insoluble reaction product. The preferred starting reaction mixture is preferably aqueous, e.g., with 20–30% polymer solids. These mixtures can have a viscosity from about 2,000 to as high as 50,000 cps. or higher at 25% solids at 25° C. With a highly reactive aldehyde, e.g., formaldehyde, on the acid side at, e.g., 90° C., the desired viscosity can be reached in a matter of minutes. At room temperatures, the viscosity can slowly rise for several weeks or more on the acid side employing less than 0.1% of the aldehyde or when employing a slowly reacting aldehyde such as dialdehyde starch. On the alkaline side, any viscosity change usually is less rapid.

Generally, when the viscosity of a 25% aqueous solution of the reaction mixture reaches 100,000 cps. or more on the acid side, optimum properties of the reaction product have been reached. On the alkaline side, the reaction mixture need merely be maintained for a sufficient length of time to insure reaction, e.g., a few hours at 70° C. or a few days at room temperature. By reacting these starting polymers, chain terminated at a reaction time at a a safe point away from gelation, with an aldehyde according to the process of this invention, a reaction product can be obtained with enhanced properties without substantial risk of insolubilization, i.e., over reaction, particularly on the alkaline side. Of course, insoluble gels can be obtained even with the aldehydes employed in the process of this invention, by deliberately adding an excess amount of aldehyde at a low pH and at an elevated temperature. However, this result can readily be avoided by employing the proper amount of aldehyde at about room temperature. Even an excess of the aldehyde will not prevent use of the resulting polymer if it is mixed with thermosetting resin at room temperature or lower, as the reaction toward insolubilization is a slow and predeterminable one, especially at lower temperatures. Also, as stated above, when the viscosity of the reaction mixture approaches the point where insolubilization appears probable, the pH can be adjusted upward or the excess aldehyde removed by volatilization or reaction with ammonia or an amine to reduce the likelihood of further reaction. The use of the polyurethanes of this invention in which the starting polymers are end-blocked with alkoxy groups, i.e., alcohol chain terminated polymers have been found to be particularly valuable.

The stability of the polymers of this invention as aqueous solutions is excellent so that they may be stored in any of their liquid or solid forms and their good water solubility permits mixing at any point in the manufacture of the resin.

PHENOLIC RESINS

The term "phenolic resins" is used herein in its conventional meaning and includes the resinous materials made from phenols and aldehydes. These resins are also conventionally termed phenoplasts, phenolics or tar-acid resins. The phenols made synthetically are derived from coal tar and primarily comprise phenol itself, cresols, xylenols and resorcinol. The most widely used phenolic resin is phenol-formaldehyde although other suitable resins include phenol-furfural, p-tertiary-amyl phenol-formaldehyde, p-tertiary-butyl phenol-formaldehyde, cresol-formaldehyde, cresol-xylenol-formaldehyde, cresylic acid-formaldehyde, phenol-p-tertiary-butylphenol-formaldehyde, phenol-cresol-formaldehyde, phenol-cresol-xylenol-formaldehyde, phenol-cresylic acid-formaldehyde, phenol - resorcinol - formaldehyde, resorcinol-formaldehyde, xylenol-formaldehyde, phenol-formaldehyde-aniline and sulfonated phenol-formaldehyde. In addition to the unmodified phenolic resins, those modified with other additives, particularly those containing natural resins, such as rosin and rosin esters are applicable. Among these are the modified phenolic resins, for example, bisphenol-formaldehyde rosin and rosin esters, p-tertiary-butylphenol-formaldehyde-rosin and rosin esters, phenol-formaldehyde-glycerol-rosin and rosin esters and phenol-formaldehyde-rosin and rosin esters.

The resinification of phenols with aldehydes proceeds in three stages: resoles or A stage resins, resitols or B stage resins and resites or C stage resins. The resoles are low molecular weight resins which are soluble in water, alkali, alcohols and ketones. Some methylol groups derived from the aldehyde undergo condensation with ortho and parahydrogen atoms in adjacent molecules to yield methylol phenols linked by means of methylene bridges. The resitols are higher molecular weight resins of the same type, no longer soluble in alkali. The higher molecular weight is obtained by additional condensation under the influence of heat and catalyst. These intermediate products are not well defined chemically but the complexity in the branching is believed to have increased although the crosslinking has not proceeded very far. Although these resins soften under the influence of heat, they are hard and brittle while cold. In the resites. essentially complete condensation of the original methylol groups has taken place and the resulting resin is insoluble and infusible. In this stage, the resin is considerably crosslinked and is said to be cured, thermoset or thermohardened, as the condensation reaction has proceeded in all three dimensions.

Generally, this final state is effected during the molding or casting of the resin into commercial products. These resins may be reacted with the water-soluble polyurethane at any of the above stages of preparation by merely incorporating into the resin the desired amount of polyurethane.

One method of preparing molding powders from the novel reaction product of this invention is to mix the product with any desired fillers, pigments, dyes and the like in any conventional apparatus such as a ribbon-type mixer. The compound is then intimately mixed on steam-heated rolls and cut by means of a knife-like device into sheets. The heat supplied by the rolls advances the condensation of the resin component further as well as advancing the reaction between the resin and any unreacted polyurethane. The product at this stage, however, is still fusible under heat and pressure. The cooled sheets are then ground and the powder is sifted to obtain the desired particle size. Instead of rolls, Banbury-type mixers may be used to bring about an intimate mixture of the resin and the fillers as well as the advancing of the mixture.

The fillers conventionally added to phenolic molding powders may be admixed to advantage with the reaction product of this invention if desired. While fillers are usually less expensive than the reaction product, and therefore, represent a decrease in the cost of the molded articles, they also fulfill certain functions as regards the mechanical and physical properties of the molded articles. For example, the electrical properties and heat resistance of the molded article may be improved by the use of fillers. In addition, other desired properties are imparted by careful choice of the filler. In general, the use of any filler depends upon the ultimate use of the finished molded article.

The fillers can be divided into organic or mineral fillers. Among the organic fillers, there are included wood flour, walnut shell flour, cellulose fiber such as cottonflock, comminuted paper, reclaimed rubber and carbon black. The most widely used mineral fillers are ground asbestos, mica, zinc oxide, barium sulfate, silica and glass fibers.

CASTING RESINS

Phenolic resins are widely used in the manufacture of casting resins with a range of color possibilities from water white transparencies to all shades and all degrees of translucency and opaqueness. Similarly, the reaction products of this invention may also be used in the manufacture of casting resins with a range of transparencies, since the water-soluble polyurethane is wholly compatible in its reaction with the phenolic resin.

In the manufacture of a typical phenolic casting resin, nonylphenol is treated with 1.5 to 2.5 moles of formaldehyde in the presence of sodium or potassium hydroxide at 70° to 100° C. The reaction is carefully controlled by the temperature, viscosity, and pH measurements. About 70 to 80% of the water is removed in a vacuum, at which time the resin is neutralized by means of an organic acid such as lactic acid. Preferably, the water-soluble polyurethane is added to the reaction mass after the neutralization. This product is then cured, whereby more complete reaction is effected.

Curing of the reaction product is dependent upon the method of casting and properties desired in the end product. Essentially, there are two types of casting; one is where the product is cast in a closed mold where it is substantially unexposed to the air, the other where the product is cast exposed to the air such as in casting on cloth or paper.

In the closed mold casting, relatively low temperatures, e.g., from about room temperature to about 150° F., are used to advance the reaction product to a hardness where it can be removed from the mold. The temperature used should be low enough to avoid blisterings in the casting. Where the reaction product is cast exposed to air, higher temperatures, e.g., up to about 400° F. or more for short periods of time, may be used to dry and advance the reaction, provided care be taken to avoid blistering.

In any case, the dried product may be cured at higher temperatures to complete the reaction to the desired degree.

PROCESS VARIABLES

The preparation of phenolic resins is a well known and commercial process. Many factors, all of which are well known, control the condensation of the phenol and aldehyde and these same factors affect the reaction of the resulting resin with the water-soluble polyurethane.

It is well established that the first step in the phenol-aldehyde condensation, in alkaline medium, involves the formation of phenol alcohol with a molar phenol-formaldehyde ratio of 1 to 1.0 Orthohydroxybenzylalcohol, as well as the para-isomers, are formed as the principal products. With an excess of formaldehyde, phenol dialcohols as well as the trialcohols are formed, although in every instance the distribution of methylol phenol occurs. The methylol (hydroxymethyl) groups, activated by the phenolic hydroxyl groups, are extremely reactive and are responsible for the condensation reaction leading to the resinification of phenol alcohols.

If the phenol-aldehyde ratio is greater than 1, the resins obtained in an acid medium are permanently fusible and soluble. Very little if any cross-linking is exhibited in these resins and they are termed novolacs. The novolacs consist essentially of a chain wherein the phenol nuclei are connected by means of methylene bridges. The mean molecular weight of this resin is usually less than about 1,000. Novolac reacts with formaldehyde under alkaline conditions with the formation of methylol groups which can then condense while under the influence of heat and pressure, thus yielding products which are equivalent to the resites. Preferably, the water-soluble polyurethane is added to the resin at the novolac stage to insure complete and uniform reactivity with the resin.

The respective amounts of phenol to aldehyde determine enormously whether the resulting resin is a two-dimensional and thermoplastic resin or a crosslinked and thermosetting resin. It is obvious that the phenol-aldehyde ratio must be less than 1 to obtain a fully cured resin. In the case of phenol-formaldehyde resins, the ratio usually lies between about 1/1.1 and about 1/1.5 for molding and laminating resins. For casting resins, this ratio lies between 1/1.5 and 1/2.5.

Since the physical structure of phenolic resins has been the subject of considerable speculation, and no clear explanation has been made regarding the structure of these resins, the structure of the product of these resins with water-soluble polyurethanes cannot be defined herein although it is believed that the product of this reaction is a copolymer of the reactants linked by methylene bridges. Consequently, these copolymers will be defined as the reaction products of phenolic resins and water-soluble polyurethanes.

AMINO RESINS

By "amino resins" as used herein, it is meant the reaction products of amines and aldehydes. Although the resins provided contain amido rather than the amino group, this terminology is utilized in order to conform to the conventional understanding of the term throughout the art. The most commercially important amino resins are the urea formaldehyde and the melamine formaldehyde condensates. The other materials, the sulfonamide, analine and thiourea resins, are in the development stage and large markets have not as yet been established for them.

In general, the amino resins are formed by condensing an amine with an aldehyde. The simplest reaction products of urea and formaldehyde are the methylol ureas. One process for the preparation of these resins consists of stirring one mole of urea with two moles of 37% formalin at 25 to 30° C. in alkaline solution until the aldehyde is completely reacted.

Monomethylolurea can be made in the same manner, using but one mole of formalin to one mole of urea, and cooling the reaction vessel with ice. Formalin is then added to a 50% aqueous solution of the urea, to form the white crystalline solid monomethylolurea which melts at 111° C. and is soluble in cold water and in warm methanol. Dimethylolurea melts at 126° C. to a clear liquid which solidifies on further heating. Dimethylolurea is also soluble in cold water and in warm alcohol.

Although the water-soluble polyurethane of this invention may be added at any time during the condensation of the urea and the aldehyde, it is preferred to add the polyurethane to the amino resin as its molecular weight approaches about 1,000. The resulting admixture is rapidly converted, by curing, to an insoluble reaction product. It has not been definitely determined whether the final cured resin is linear or cyclic in nature and it is similarly not clear whether the reaction product of these resins with the water-soluble polyurethanes is linear or cyclic. Consequently, these resins will be defined herein as the reaction products of amino resins and water-soluble polyurethanes.

The conditions of reaction of melamine with aqueous formaldehyde are somewhat different from the reactions of urea. Because of the low solubility of melamine in water, the reactions are usually conducted at temperatures of 80 to 100° C. to bring the melamine into solution more readily. The amino groups of melamine can each add two methylol groups, while in urea, apparently only one mole of formaldehyde adds to each amino group. Hexamethylolmelamine is formed by heating melamine at 90° C. with an excess of neutral formaldehyde or at room temperature for 15 hours. The water-soluble polyurethane is preferably added after some condensation has occurred.

Just as with the phenolic resins, it is not possible to identify definitely the structures of the cured amino resins per se, and similarly it is not possible to define exactly the structure of the resin reacted with the water-soluble polyurethane. It is believed, however, that copolymers linked by methylene bridges are formed during the reaction.

Fillers and mold lubricants and the like may be added to these reaction products as desired. The same type fillers as for phenolic resins are applicable, α-cellulose and wood flour being the most widely used. Zinc stearate comprises a suitable mold lubricant, while α-dichlorohydrin (0.8%) may be added as an accelerator if desired. In some instances, 20 to 30% of the amine may be replaced with thiourea.

The usual methods of molding phenolic and amino resins are applicable to reaction products of this invention. The granules are performed to give pills or tablets of the desired weight, having a density approaching that of the finished piece. Molding of the resin-polyurethane reaction product may be carried out at 280 to 320° F., which can be reached at steam pressures of from 40 to 120 pounds per square inch. Since these reaction products may overcure, temperatures in excess of 320° F. are not desirable. By preheating the molding material, considerable time can be saved in the molding operation and lower pressures can be employed. Heating of preforms to 175° F. before placing in the mold is effective in this respect. If higher temperatures are used, the time of preheating must not be too long, or the reaction product may harden and fail to mold satisfactorily. The time required for curing the reaction product depends largely on the thickness and size of the piece and may vary from less than a minute to 10 minutes.

Aniline formaldehyde molding materials are thermoplastic, but generally are not plastic enough to be used for injection molding. By reacting a water-soluble polyurethane with the aniline formaldehyde resin, the necessary degree of plasticity is provided so that injection molding may be effected. The moldings are translucent and reddish brown. A water-soluble polyurethane may be reacted also with a furane resin, e.g., the resin derived from furfuryl alcohol, to enhance its shock resistance and flexibility.

While the above discussion relates specifically to water-soluble polyurethanes, water-insoluble polyurethanes may also be reacted with the resin if desired. This embodiment of the invention necessitates, however, the additional cost and inconvenience of meticulously blending the co-reactants and is not as desirable a process as when aqueous and/or alcohol solutions of the polyurethane and resin components are simply blended to form a molecular solution of the reactants.

The following examples illustrate preferred embodiments of the present invention.

*Example I*

Polyethylene ether glycol (3750 gms.), having an average molecular weight of about 6,000, is placed in a 12 liter three-neck round bottom flask and heated under nitrogen with rapid stirring at 70 to 80° C. The glycol is dried by adding 250 milliliters of toluene, which is then stripped at reduced pressure. To 1250 milliliters of dry toluene is added 4.4 gms. of a 6% solution of cobalt naphthanate in dry xylene, and this solution is added to the polyethylene ether glycol melt at 75 to 80° C. with stirring. Tolylene 2, 4-diisocyanate (131 gms.) is added to the resulting solution over a ten minute period and stirred for another ten minutes, during which time a 2 to 5° temperature rise is noticed. About 10 to 20 drops (0.4 to 0.8 gms.) of water is then added slowly, dropwise, to the mixture which is then stirred at 80° C. to 95° C. for 15 minutes. When the viscosity reaches about 200,000 centipoises at about 85° C. (90 to 120 minutes) 1250 milliliters of dry toluene is added slowly (90 to 120 minutes), while maintaining the temperature above 80° C., until the viscosity reaches about 500,000 centipoises. After adding 7.5 liters of water, the toluene is distilled off at reduced pressure. The polyurethane so formed is added to phenolic resin No. 18948 of the Durez Plastics Company (a liquid resin containing 68.6% solids) in an amount to obtain 40% by weight of the polyurethane in the reaction product formed, (on a dry basis.) A thin layer of the resulting mixture is cast onto an 80 x 80 cotton fabric and dried for one hour between 60° and 70° C. and cured for two hours at 100° C. whereby the phenolic resin and polyurethane react to provide a highly flexible film of material on the fabric.

*Example II*

The procedure of Example I is followed except that the polyurethane synthesis reaction is terminated after the viscosity reaches 200,000 centipoises by stirring into the reaction mass 100 gms. of absolute ethanol. The resulting coated fabric is flexible to the same extent as the fabric of Example I.

*Example III*

The procedure of Example I is followed except that 187 gms. of diphenylmethane 4, 4'-diisocyanate is substituted for the tolylene 2, 4-diisocyanate. The polymer produced according to this procedure has a viscosity as a 25% aqueous solution at 25° C. of about 6,000 centipoises.

*Example IV*

Following the procedure of Example I, the flask containing the polyurethane (when it has reached a viscosity of about 300,000 centipoises) is equipped with a reflux condenser and 104 gms. of propylene oxide are slowly added. After about 10 minutes, excess propylene oxide is removed by distillation at reduced pressure. When the viscosity reaches 500,000 centipoises, (usually 5 to 15 minutes) the reaction mixture is then transferred to a 20 liter flask, 7.5 liters of water are added to the mixture and the toluene is distilled off at reduced pressure. There is obtained a clear amber solution of about 38.4% solids having a viscosity of about 10,000 centipoises at 25° C.

This polyurethane is admixed with phenolic resin (Durez No. 18948) in accordance with the following formulation:

|  | Dry Basis | Wet Basis |
|---|---|---|
| Phenolic Resin (68.6% solids) | 120 | 175 |
| Ethyl Alcohol | | 200 |
| Polyurethane (38.4% solids) | 80 | 208 |
| Ethyl Alcohol | | 417 |
|  | 200 | 1,000 |

The alcohol is added to the aqueous solutions of the phenolic resin and the polyurethane separately after which the two solutions are stirred to provide a uniform mixture. The resulting clear solution is used to impregnate an 80 x 80 cotton fabric, whereby the weight of the fabric is increased by about 10%. This fabric is dried and then cured at 90° C. for one hour to provide a flexible impregnated fabric of improved abrasion resistance.

*Example V*

The procedure of Example IV is followed except that the reaction of propylene oxide and polyurethane is terminated, after the viscosity reaches 500,000 centipoises, by stirring in 100 gms. of absolute ethanol. Heating is discontinued and 5 liters of hot water are stirred into the modified polyurethane before the reaction mixture is transferred to the 20 liter flask, after which the toluene is distilled off at reduced pressure.

*Example VI*

The procedure of Example V is followed except that 120 gms. of tolylene 2, 4-diisocyanate and 3.3 gms. of the 6% cobalt napthanate solution is employed. The viscosity at 25° C. of a 25% aqueous solution of the polymer produced according to this procedure is about 10,000 centipoises.

*Example VII*

The procedure of Example V is followed except that polyethylene ether glycol, having an average molecular weight of 4,000 (Carbowax 4,000) and 210 gms. of tolylene 2, 4-diisocyanate is employed.

*Example VIII*

The procedure of Example V is followed except that the reaction is terminated with 100 gms. of N-butanol instead of ethanol.

*Example IX*

The procedure of Example V is followed except that isopropanol is substituted for the ethanol. The polymer produced according to this procedure is substantially identical to that obtained in Example II. Similarly, absolute methanol can be substituted for the ethanol to obtain substantially an identical product.

*Example X*

A 25% aqueous solution of the polyurethane produced according to Example V is adjusted to a pH of 8.2 with 1 N sodium hydroxide. Sufficient 10% formalin is then added under a blanket of nitrogen and with stirring to give 1.25% formaldehyde calculated on the polymer solids. The resulting mixture is heated to 70° C. for 30 minutes, after which sufficient 10% aqueous ammonia is added to bring the pH to about 8.5 to 9.0. This mixture is then stirred for another 20 minutes. The polyurethane so produced is then added to phenolic resin No. 18948 of the Durez Plastics Company (a liquid resin containing 68.6% solids) in an amount sufficient to provide at least 40% by weight of the polyurethane, in the finished product, on a dry basis. A fabric coated as in Example V has similar flexibilty and abrasion resistance characteristics.

Similar results are obtained employing starting materials prepared in the manner described in Example V employing a polyethylene ether glycol having a molecular weight of about 4,000 or polypropylene ether glycol having a molecular weight of about 600 and employing acetaldehyde, benzaldehyde, (1% and 7%) or 30% aqueous glyoxal for the formaldehyde.

Substantially similar results are also obtained when the unmodified polyurethane of Example I is aldehyde modified by the above procedure.

*Example XI*

Following the procedure of Example V, phenolic resin-polyurethane systems containing varying amounts of the resin modified polyurethane, alcohol and water are formulated. Sufficient alcohol and water are added to reduce the solids to the desired level and to maintain both components in solution, since this particular phenolic resin has already been advanced to a stage of low water dilutability when obtained. Each of the formulations is poured into an aluminum dish of 2 inch diameter. Each of these is dried for 24 hours at 55° C. then for an additional 24 hours at 65° C. and finally for an additional 24 hours at 90° C., during which time the phenolic resin and polyurethane react to provide films of about 0.020 inch thickness. The aluminum dishes are then digested in hydrochloric acid and the freed samples washed in cold water until acid free. The samples are then dried overnight at 65° C.

These formulations and the films therefrom, are shown below in Table I. The phenolic resin used in the formulations below contains 68.6% solids and the polyurethane 38.4%.

TABLE I

| | Resin Weight (dry basis) | Polyurethane Weight (dry basis) | Alcohol (Parts) | Water (Parts) | Film Characteristics |
|---|---|---|---|---|---|
| 1 | 100 | | 161 | | Brittle. |
| 2 | 95 | 5 | 161 | | Only slightly flexible but more so than control. |
| 3 | 90 | 10 | 178 | | Slightly flexible; better than No. 2. |
| 4 | 80 | 20 | 202 | | Flexible (0.020 inch film 2 inches long can be bent back upon itself without breaking). |
| 5 | 70 | 30 | 178 | 50 | Very flexible (0.020 inch film 2 inches long can be bent back upon itself and rolled into ⅜ inch diameter roll without breaking). |
| 6 | 60 | 40 | 156 | 50 | Rubbery, slightly water-swellable. |
| 7 | 50 | 50 | 180 | 50 | Very rubbery, moderately water-swellable. |
| 8 | 40 | 60 | 206 | 50 | Very rubbery, highly water-swellable. |
| 9 | 30 | 70 | 242 | 60 | Very rubbery, highly water-swellable. |

*Example XII*

A melamine formaldehyde resin sold under the trade name of Aerotex M-3 (80% aqueous solution), is admixed with a 38.4% aqueous solution of the polyurethane of Example V, to provide formulations in the dry weight proportions shown in Table II. A suitable catalyst (an amine hydrochloride) sold under the trade name of Catalyst AC is added in the amounts shown. These reactants are then dried and cured as in Example XI to provide films, the characteristics of which are given to Table II.

TABLE II

| Resin | Polyurethane | Catalyst | Film Characteristics |
|---|---|---|---|
| 1 | 40.0 | -------- | 1.2 | Very slightly flexible. |
| 2 | 38.0 | 2.0 | 1.14 | Slightly flexible. Better than control. |
| 3 | 36.0 | 4.0 | 1.08 | Fairly flexible. |
| 4 | 32.0 | 8.0 | 0.97 | Moderately flexible. |
| 5 | 28.0 | 12.0 | 0.84 | Flexible. Can be bent through an angle of about 80°. |
| 6 | 24.0 | 16.0 | 0.72 | Flexible. (0.020 inch diameter film, 2 inches long, can be bent back upon itself without breaking.) |
| 7 | 20.0 | 20.0 | 0.6 | Same as 6. Moderately water-swellable. |
| 8 | 16.0 | 24.0 | 0.48 | Rubbery, can be rolled into low diameter roll without breaking, highly water-swellable. |
| 9 | 12.0 | 28.0 | 0.36 | Very rubbery. Highly water-swellable. |

*Example XIII*

Substantially similar results are obtained as in Examples XI and XII, when a urea-formaldehyde resin sold under the trade name of Uramol is substituted for the phenolic resin and melamine resin, respectively.

*Example XIV*

Flexible films are also produced when the aldehyde-modified polyurethanes of Example X are substituted for the polyurethanes of Examples XI and XII.

*Example XV*

Substantially similar results are obtained as in Examples XI and XII when mixtures of these resins are substituted, namely, phenolic-melamine (50/50), phenolic-urea (70/30), melamine-urea (80/20) and phenolic-melamine-urea resins (50/40/10).

That which is claimed is:

1. A novel composition of matter comprising the reaction product of a polyurethane with at least 25% by weight of a thermosetting resin selected from the group consisting of phenolic resins, amino resins, and mixtures thereof, said polyurethane being characterized by recurring units of the formula:

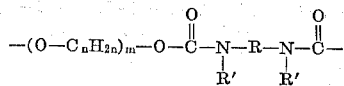

wherein $n$ is an integer from 2 to 8, inclusive, $m$ is an integer from about 15 to about 450, R is a divalent radical selected from the group consisting of aliphatic and aromatic and R' is selected from the group consisting of hydrogen and —CH(R'')—CH(R''—OH, wherein R'' is a radical selected from the group consisting of hydrogen, aliphatic and aromatic.

2. The composition of matter of claim 1 wherein the thermosetting resin comprises a phenol-formaldehyde resin.

3. The composition of matter of claim 1 wherein the thermosetting resin comprises melamine-formaldehyde resin.

4. The composition of matter of claim 1 wherein the thermosetting resin comprises urea-formaldehyde resin.

5. The composition of matter of claim 1 wherein the polyurethane is present in an amount of at least about 2% by weight of the polymeric solids in the reaction product.

6. The composition of matter of claim 5 wherein the polyurethane is present in an amount between about 2 and about 20% by weight.

7. The composition of matter of claim 5 wherein the polyurethane is present in an amount between about 20 and about 50% by weight.

8. The composition of matter of claim 5 wherein the polyurethane is present in an amount between about 50 and about 75% by weight.

9. The composition of matter of claim 1 wherein R is a divalent carbocyclic aryl radical.

10. The composition of matter of claim 9 wherein R comprises a phenylene radical, $n$ is 2 and $m$ is from about 45 to about 225.

11. The composition of matter of claim 10 wherein R comprises 2,4-tolylene, $m$ is from about 100 to about 160 and R' is hydrogen.

12. The composition of matter of claim 5 wherein R' comprises —CH(R'')—CH(R'')—OH.

13. The composition of matter of claim 12 wherein R'' has the formula CH(R''')—CH(R''')—OH, wherein R''' is selected from the group consisting of hydrogen and a radical of the formula

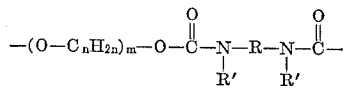

wherein R and R' have the value given in claim 3 and $R^{iv}$ comprises a chain terminating radical.

14. The composition of matter of claim 13 wherein R'' has the formula —CH(CH₃)—CH₂OH.

15. The composition of matter of claim 14 wherein R comprises a 2,4-tolylene radical.

16. A novel composition of matter comprising the reaction product of from about 25 to 98% by weight of a thermosetting resin selected from the group consisting of phenolic resins, amino resins and mixtures thereof with a polyurethane prepared by reacting an aldehyde, at a pH of between about 3 and about 10, with a polyalkylene ether glycol polyurethane having polymeric units of the formula:

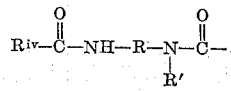

wherein $n$ is an integer from 2 to 8, inclusive, $m$ is an integer from about 15 to about 450, R is a divalent carbocyclic radical and R' is selected from the group consisting of hydroegn and —CH(R'')—CH(R'')—OH, wherein R'' is selected from the group consisting of hydrogen and lower alkyl.

17. The composition of matter of claim 16 wherein the aldehyde comprises formaldehyde, R comprises a phenylene radical, $n$ is 2 and $m$ is from about 45 to about 225.

18. The composition of matter of claim 16 wherein R' is —CH(R'')—CH(R'')—OH, wherein R'' is selected from the group consisting of hydrogen and lower alkyl.

19. The composition of matter of claim 17 wherein R comprises a 2,4-tolylene radical, R' comprises hydrogen and $m$ is from about 100 to about 160.

20. The composition of matter of claim 17 wherein R' comprises —CH(CH₃)—CH₂OH and wherein R comprises a 2,4-tolylene radical and $m$ is from about 100 to about 160.

21. The composition of matter of claim 18 wherein the thermosetting resin comprises a phenol-formaldehyde resin.

22. The composition of matter of claim 18 wherein the thermosetting resin comprises a melamine-formaldehyde resin.

23. The composition of matter of claim 18 wherein the thermosetting resin comprises urea-formaldehyde resin.

24. A molded article comprising the composition of matter of claim 6.

25. A film comprising the composition of matter of claim 7.

26. A film comprising the composition of matter of claim 8.

27. A fabric impregnated with the composition of matter of claim 7.

28. A fabric impregnated with the composition of matter of claim 8.

29. The process comprising reacting a polyurethane with at least 25% by weight of a thermosetting resin selected from the group consisting of phenolic resins, amino resins, and mixtures thereof, said polyurethane being characterized by recurring units of the formula:

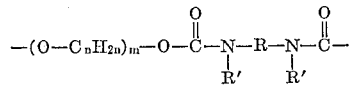

wherein $n$ is an integer from 2 to 8, inclusive, $m$ is an integer from about 15 to about 450, R is a divalent radical selected from the group consisting of aliphatic and aromatic and R' is selected from the group consisting of hydrogen and —CH(R'')—CH(R'')—OH, wherein R is a radical selected from the group consisting of hydrogen, aliphatic and aromatic.

30. The process of claim 29 wherein R comprises a divalent carbocyclic aryl radical, $n$ is 2, $m$ is from about 100 to about 160 and R' is hydrogen.

31. The process of claim 29 wherein R' comprises —CH(R'')—CH(R'')—OH.

32. The process of claim 31 wherein R'' has the formula $$-CH(CH_3)-CH_2OH$$

33. The process comprising reacting a polyurethane with a thermosetting resin selected from the group consisting of phenolic resins, amino resins and mixtures thereof wherein the polyurethane is prepared by reacting an aldehyde, at a pH of between 3 and about 10, with a polyalkylene ether glycol polyurethane having polymeric units of the formula:

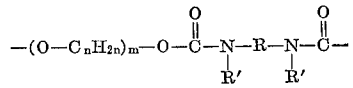

wherein $n$ is an integer from 2 to 8, inclusive, $m$ is an integer from about 15 to about 450, R is a divalent radical selected from the group consisting of aliphatic and aromatic and R' is selected from the group consisting of hydrogen and —CH(R'')—CH(R'')—OH, wherein R'' is a radical selected from the group consisting of hydrogen, aliphatic and aromatic.

34. The process of claim 33 wherein the aldehyde comprises formaldehyde, R comprises a divalent carbocyclic aryl radical, $n$ is 2, and $m$ is from about 100 to about 160, and R' comprises hydrogen.

35. The process of claim 34 wherein R' comprises —CH(R'')—CH(R'')—OH.

36. The composition of matter of claim 1 wherein the polyurethane is capable of forming a clear aqueous solution of about 10,000 centipoises viscosity at 25° C.

37. The composition of matter of claim 2 wherein the phenol-formaldehyde resin is a resole.

38. The process of claim 29 wherein the polyurethane is capable of forming a clear aqueous solution of about 10,000 centipoises viscosity at 25° C.

39. The process of claim 38 wherein the thermosetting resin comprises a phenol-formaldehyde resin in the resole stage.

References Cited by the Examiner
UNITED STATES PATENTS

| | | | |
|---|---|---|---|
| 2,993,813 | 7/1961 | Tischbein | 117—161 |
| 3,028,345 | 4/1962 | Johnson | 260—2.5 |
| 3,028,353 | 4/1962 | Elmer et al. | 260—77.5 |

MURRAY TILLMAN, *Primary Examiner.*

WILLIAM H. SHORT, *Examiner.*